UNITED STATES PATENT OFFICE.

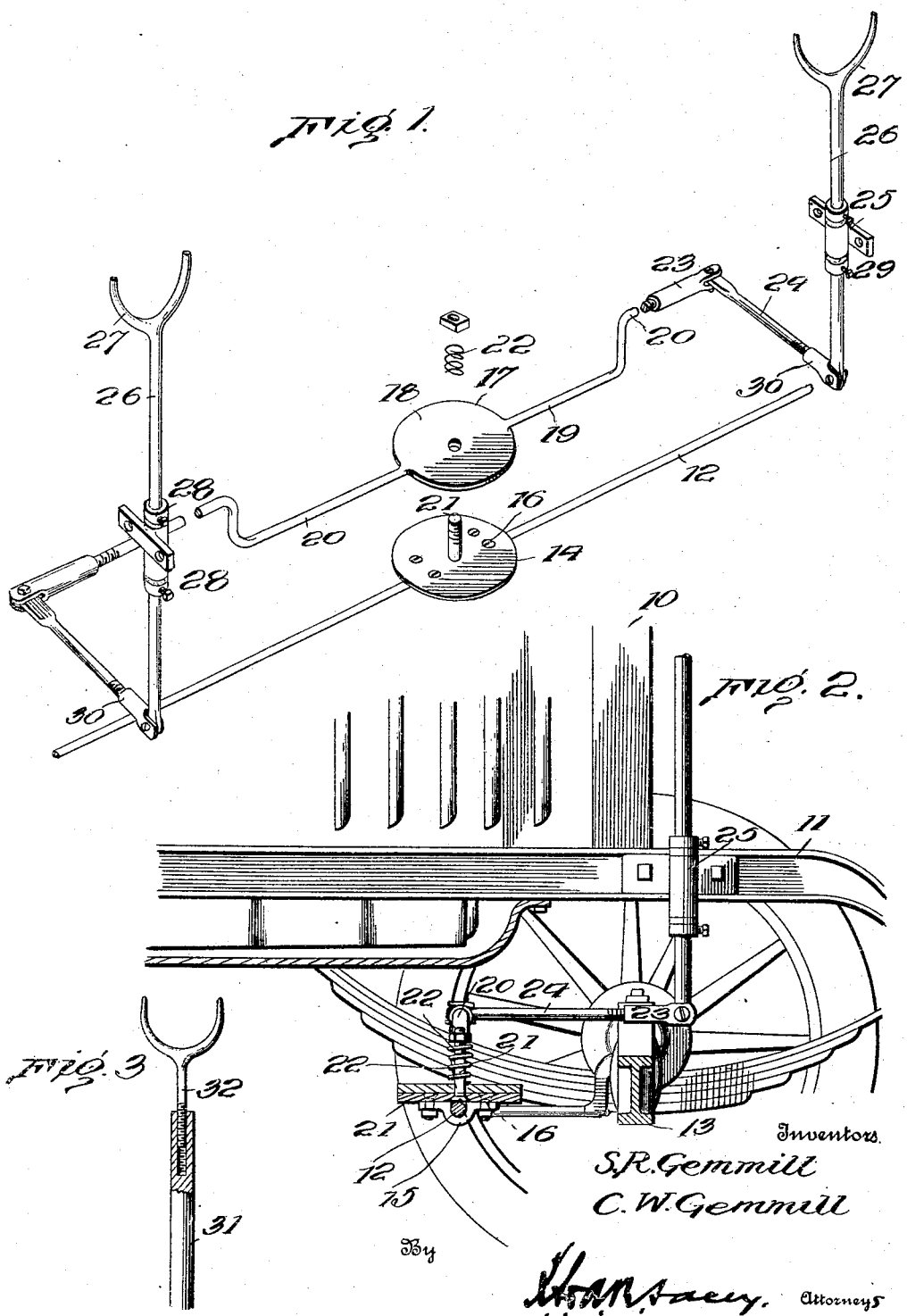

SAMUEL R. GEMMILL AND CLARENCE W. GEMMILL, OF SOUTH ENGLISH, IOWA.

HEADLIGHT-STEERING MECHANISM.

1,198,835.   Specification of Letters Patent.   Patented Sept. 19, 1916.

Application filed June 19, 1915. Serial No. 35,040.

*To all whom it may concern:*

Be it known that we, SAMUEL R. GEMMILL and CLARENCE W. GEMMILL, citizens of the United States, residing at South English, in the county of Keokuk and State of Iowa, have invented certain new and useful Improvements in Headlight-Steering Mechanisms, of which the following is a specification.

This invention contemplates an improved automobile headlight steering mechanism and has as its primary object to provide a construction wherein the headlights will be turned as the automobile is guided, to direct the rays of light from the headlights in the path of the machine.

The invention has as a further object to provide a construction adapted for attachment to the connecting rod of the automobile steering mechanism and of such character that when the said connecting rod is shifted as the automobile is guided, a corresponding turning motion will be imparted to the headlights.

A still further object of the invention is to provide a construction which may be readily employed in connection with any conventional type of automobile, as now upon the market, which will be simple in construction, and wherein the several elements thereof may be readily detached from each other to permit of replacement or repair.

Other and incidental objects will appear as the description proceeds and in the drawings wherein we have illustrated the preferred embodiment of the invention and wherein similar reference characters designate corresponding parts throughout the several views, Figure 1 is a perspective view showing the mechanism detached and illustrating the manner in which it is to be mounted upon the connecting rod of an automobile steering mechanism, Fig. 2 is a fragmentary sectional view showing the mechanism attached to a conventional type of motor vehicle, and Fig. 3 is a fragmentary elevation partly in section showing a slightly modified construction in the mounting of the lamp receiving forks.

In order that the application and use of the present invention may be clearly brought out, we have, in the drawings, illustrated our improved mechanism in connection with a conventional type of motor vehicle, a fragmentary sectional view of which appears in Fig. 2. The motor vehicle is indicated as a whole at 10, and includes the chassis side members 11, and as a part of the steering mechanism thereof, a connecting rod 12 adapted to be reciprocated to guide the front wheels of the vehicle. As is usual, the connecting rod is disposed in the rear of the front axle 13 of the vehicle and is arranged in a plane below the upper edge of the said axle.

Coming now more particularly to the subject of the present invention, we employ a bearing member 14 which is fixed upon the upper side of the connecting rod 12 at a point substantially midway its ends. The bearing member 14 is in the nature of a disk or flat plate and is held upon the connecting rod by U-shaped clips 15 embracing the connecting rod and joined with the bearing member by bolts 16 having their heads countersunk within the upper face of the plate.

Arranged to coact with the bearing member 14 is a pivotally mounted member or link indicated as a whole in Fig. 1 by the numeral 17. This link includes a bearing member 18 in the nature of a disk or plate similar to the bearing member 14 and adapted to seat flatly upon the bearing member 14 to turn thereon as shown in Fig. 2 of the drawings. Extending from opposite sides of the disk 18 are diametric arms 19 which are offset adjacent their outer extremities to provide legs 20 supporting the outer ends of the arms laterally upon one side of and above the shaft. Since the connecting rod 12 is disposed below the upper edge of the front axle 13, the purpose in offsetting the arms 19 will be entirely clear, since by such construction, the outer extremities of the arms will be supported in a plane above the said axle. Furthermore in offsetting the arms adjacent the outer extremities thereof, the element 17 will clear the motor pan of the vehicle, so that the said element may be shifted.

Connecting the link 17 with the bearing member 14 is an upstanding pivot pin 21 in the nature of a bolt having its head countersunk in the lower face of the bearing member 14 with the bolt projecting upwardly through the said bearing member to freely receive the disk 18. The disk 18 will therefore turn about the pin 21 as an axis and will consequently pivotally support the member 17. The bolt 21 is, at its upper extremity, provided with a terminal nut and interposed between the said nut and the disk 18 is a helical spring 22 which surrounds the bolt and normally urges the member 17 to seat upon the bearing member 14.

The outer extremities of the arms 19 of the member 17 are screw threaded to adjustably receive the internally screw threaded hollow sleeves of terminal yokes 23 and pivotally connected to said yokes are links 24 which are arranged to project forwardly over the front axle of the motor vehicle as particularly shown in Fig. 2 of the drawings.

Mounted upon the side members 11 of the chassis of the motor vehicle at suitable points, are oppositely disposed bearing sleeves 25 which may be connected with the said members in any suitable manner as by bolts or rivets as illustrated in the drawing. Freely mounted within the sleeves 25 are vertically arranged lamp receiving posts 26 which, at their upper extremities, terminate in forks 27 adapted to receive lamps in the well known manner. Detachably connected to each of the posts 26 and arranged one upon each side of the adjacent bearing sleeve 25, are a pair of bearing collars 28 which are provided with radial set screws 29 for holding the collars in position.

By this construction, it will be observed that the collars 28 will support the post 26 to turn upon the bearing sleeves 25 with the lower extremities of the posts extending downwardly and preferably terminating adjacent the forward extremities of the links 24 in a plane with the outer ends of the rods 19. Pivotally connecting the links with the said posts are terminal yokes 30 which are similar to the yokes 23 and are adjustably screw threaded upon the links.

From the preceding description, it is thought that the operation of our improved mechanism will be readily understood. When the connecting rod 12 is reciprocated to turn the front wheels of the motor vehicle, the member 17 will be reciprocated therewith. Since the links 24 are longer than the arm supporting the connecting rod 12, the member 17, simultaneously with such reciprocating movement, will be caused to turn or pivot upon the bearing member 14 under the influence of the said links. It will now be observed that the links 24 are so connected to the posts 26 that when the operating element 17 is shifted upon the rod 12, a corresponding turning movement will be imparted to the posts 26 to consequently shift the lamps. The improved mechanism may be applied to any conventional type of motor vehicle and to make this easily possible, the yokes 23 and 30 are adjustable so that they may be easily positioned to accord with the dimensions of any particular automobile. Further, it will be seen that the several parts of the mechanism may be readily detached from each other to permit of repair while the entire mechanism may be easily detached from the automobile.

In Fig. 3 of the drawings, we have illustrated a slightly modified form of lamp receiving post 31. In this modification, the upper extremity of the post is provided with a screw threaded axial bore detachably receiving the screw threaded shank of a lamp fork 32. By this arrangement, the fork may be readily detached from the post.

Having thus described our invention, what we claim and desire to secure by Letters Patent is:—

1. A headlight steering mechanism including a bearing member, a member pivoted at a point intermediate its ends to turn upon the said bearing member, means normally urging the said second mentioned member to seat upon the bearing member, shiftably mounted lamp receiving posts, and means connecting the posts with the said second mentioned member, the bearing member being adapted for attachment to the connecting rod of a vehicle steering gear whereby reciprocation of the said rod will turn the posts.

2. A headlight steering mechanism including rotatable lamp receiving posts, a bearing member, means connecting the said posts and including a member pivotally connected at a point intermediate its ends with the bearing member and having its extremities operatively connected to the posts, and yieldable means for urging the said last mentioned member toward the bearing member, the bearing member being adapted for attachment to the connecting rod of a vehicle steering gear whereby the reciprocation of said rod will swing said second mentioned member about its pivot and rotate the said posts.

3. A headlight steering mechanism including rotatable lamp receiving posts, a bearing member, a member pivoted at a point intermediate its ends with the bearing member, a pin connecting the said second mentioned member with the bearing member, a spring surrounding the said pin and engaging said second mentioned member for urging it to a position coacting with the bearing member, and means connecting the free extremities of said second mentioned member with the posts, the bearing member being adapted for attachment to the connecting rod of a vehicle steering gear whereby reciprocation of the said rod will swing said second mentioned member about its pivot upon the bearing member and rotate the said posts.

4. A headlight steering mechanism including rotatable lamp receiving posts, a bearing member, a member having arms joined by a plate coacting with the bearing member and pivotally connected thereto, and means connecting the said arms with the said posts, the bearing member being adapted for attachment to the connecting rod of a vehicle steering gear whereby reciprocation of the said rod will swing the said second mentioned member about its pivot and rotate the said posts.

5. A headlight steering mechanism including rotatable lamp receiving posts, a bearing member, a member formed intermediate its ends with a flattened portion coacting with the bearing member and pivotally connected thereto, and means connecting the said second mentioned member with the said posts, the bearing member being adapted for attachment to the connecting rod of a vehicle steering gear whereby reciprocation of the said rod will swing the said second mentioned member about its pivot and rotate the said posts.

In testimony whereof we affix our signatures.

SAMUEL R. GEMMILL. [L. S.]
CLARENCE W. GEMMILL. [L. S.]

Copies of this patent may be obtained for five cents each, by addressing the "Commissioner of Patents, Washington, D. C."